July 4, 1939.  J. G. KIMMEL  2,164,684
METHOD OF INJECTING FUEL INTO INTERNAL COMBUSTION ENGINES
Filed Feb. 6, 1937
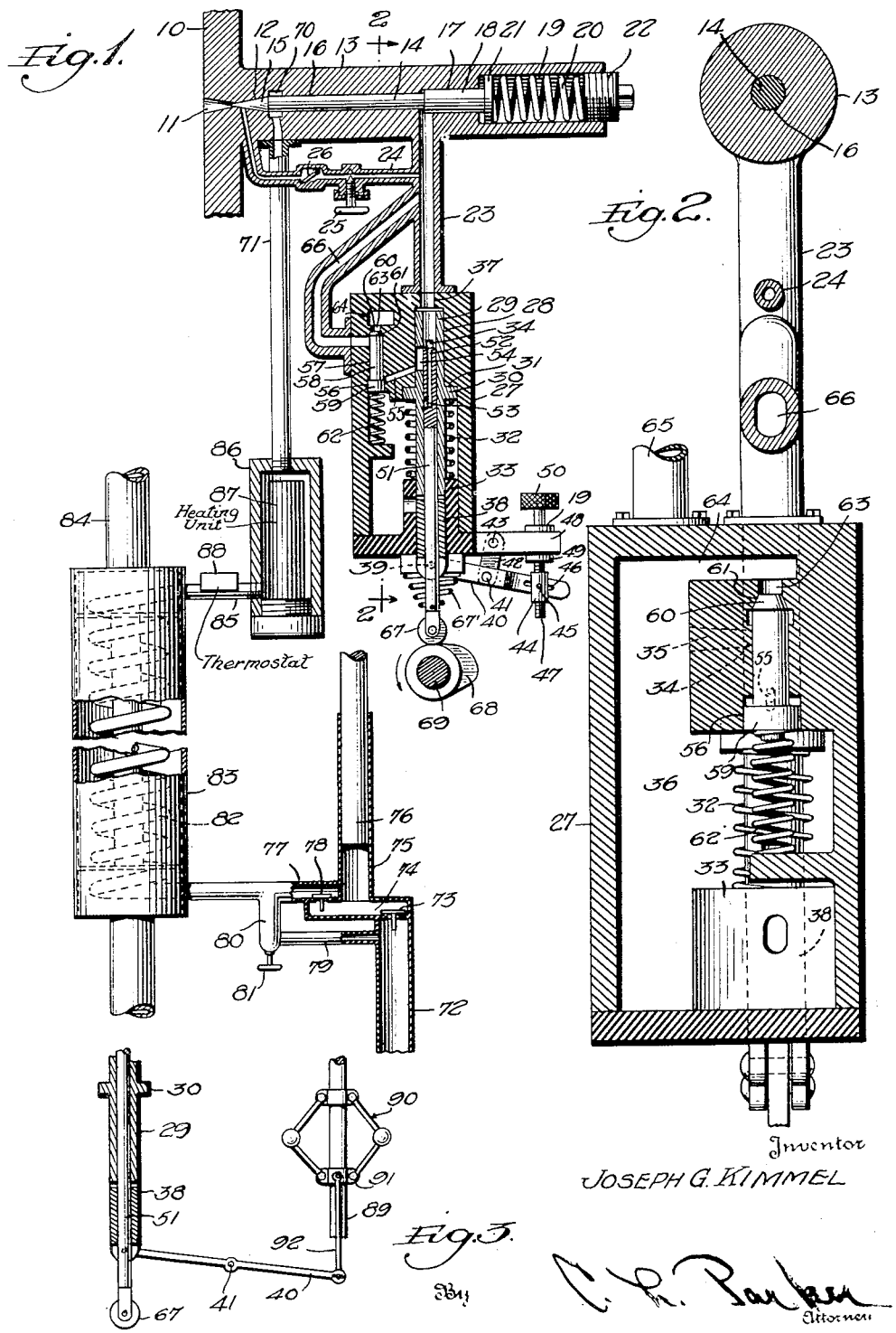
Inventor
JOSEPH G. KIMMEL Patented July 4, 1939

2,164,684

UNITED STATES PATENT OFFICE 2,164,684

METHOD OF INJECTING FUEL INTO INTERNAL COMBUSTION ENGINES

Joseph G. Kimmel, Sarasota, Fla.

Application February 6, 1937, Serial No. 124,478

6 Claims. (Cl. 123—32)

This invention relates to method of injecting fuel into internal combustion engines.

In internal combustion engines of the type wherein fuel charges are injected into the engines by external pressure, such as Diesel engines, two general methods of injection have been commonly employed, namely, air and mechanical injection. Mechanical injection is principally employed, especially in smaller engines, and is advantageous over air injection since it eliminates the chilling effect on the fuel resulting from the expansion of air and because it eliminates the loss of approximately 10 per cent. in power, such power being required for the operation of the compressor. On the other hand air injection is advantageous for the reason that it provides thorough atomization of the fuel, which shortens the period for igniting the fuel after injection and thus assures more uniform burning of the fuel, but it requires additional compression of from 50 to 100 pounds over that required in mechanical injection to insure ignition.

Generally speaking, the principal object of the present invention is to provide a method of injecting fuel into an internal combustion engine, wherein the principal advantage of air injection, namely, fuel atomization, is retained, while eliminating the principal disadvantage of such system, namely, the chilling of the fuel.

More specifically, an object of the invention is to provide a method of fuel injection for internal combustion engines which involves the use of a fluid, which is normally a liquid, as the fuel injecting medium, and wherein such medium is used for injecting the fuel after being vaporized, or brought to the point of vaporization, by the application of heat at a pressure in excess of the pressure in the cylinder.

A further object is the provision of a method for the injection and atomization of fuel oil in an internal combustion engine by utilizing the hot vapor of a normal liquid under pressure in excess of that in the engine cylinder, the pressure and temperature of the injecting fluid being maintained principally by the use of waste heat from the engine, thus effecting a considerable saving in energy over the conventional methods of air injection.

A further object is to provide a method of injecting a heavy fuel oil into an internal combustion engine by means of a light liquid fuel which has been heated to vaporization, or substantially to the point of vaporization, at a pressure in excess of that in the engine cylinder.

Other objects and advantages of the invention will become apparent during the course of the following description.

In the drawing I have shown two embodiments of the invention particularly adapted for practicing the method. In this showing:

Figure 1 is a sectional diagrammatic view of the system, parts being shown in elevation and parts being broken away, Figure 2 is an enlarged vertical sectional view on line 2—2 of Figure 1, and, Figure 3 is a sectional diagrammatic view showing a modified form of lever control means.

Referring to Figure 1, the numeral 10 designates a portion of an internal combustion engine cylinder wall having a fuel injection opening 11 communicating with a needle valve seat 12. The cylinder wall is shown as being provided with a lateral or radial extension 13 in which is arranged a stem 14 carrying a needle valve 15 at its inner end engageable with the seat 12.

The stem 14 is slidable in an opening 16 formed in the extension 13 and adjacent the outer end of the stem 14, this opening is substantially enlarged as at 17 to slidably receive a small piston 18, connected to and of greater diameter than the stem 14. Outwardly of the opening 17 the extension 13 is provided with an enlarged opening 19 in which is arranged a compression spring 20 seated at its inner end against a head 21 formed integral with the piston 18. A plug 22 is threaded in the outer end of the opening 19 in engagement with the spring 20. It will be apparent that this spring is of the compression type and of any desired tension, and the normal tension of this spring may be adjusted by turning the plug 22.

A conduit 23 has its upper end communicating with the inner end of the opening or cylinder 17 and liquid under pressure is supplied through the conduit 23, in a manner to be described, to act against the inner end of the piston 18 to move the latter against the tension of the spring 20 to open the needle valve 15. In this connection, it will be noted that when the needle valve 15 is seated, the inner end of the piston 18 is slightly spaced from the inner end of the cylinder 17 whereby fluid under pressure in the conduit 23 is free to act on the inner end of the piston 18.

In accordance with the preferred practice of the invention, the fluid under pressure in the conduit 23 is the liquid fuel oil which is supplied to the engine. The conduit 23 is provided with a branch passage 24 which leads to the interior of the valve seat 12 to discharge fluid therethrough into the cylinder 10 when the valve 15 is unseated. If desired, a throttle valve 25 is provided in the passage 24. This valve, however, may be omitted where the rate of fuel consumption is comparatively uniform, in which case the cross-sectional area of the passage 24 will be made of such size as to deliver fuel at the proper rate to the nozzle 11. A check valve 26 also may be provided in the passage 24 if the engine is used in connection with fuel which has sufficient low boiling fractions to form a considerable amount of vapor upon the release of pressure during or after the return stroke of the pump plunger which supplies the fuel oil, and which will be described later.

A casing 27 contains the mechanism which supplies the fuel under pressure to the conduit 23. Referring to Figure 1, it will be noted that the casing 27 is provided with a cylindrical opening 28 in which is arranged a sleeve 29 having a flange 30 intermediate its ends engageable with a shoulder 31 to limit the upward movement of the sleeve 29. A spring 32 engages the lower face of the flange 30 to urge the sleeve 29 upwardly, the lower end of this sleeve seating against the upper end of a guide 33 in which the lower end of the sleeve 29 is slidable.

The sleeve 29 normally occupies the position shown in Figure 1 and it will be noted that this sleeve is provided with a port 34 which communicates through a port 35 with a reservoir 36 formed within the casing 27. The port 34 admits fuel oil into the interior of the sleeve 29 under conditions to be described, this port being in registration with the port 35 when the sleeve 29 is in the normal position shown in Figure 1. Moreover, the upper end of the sleeve 29 is spaced from the upper end of the cylinder 28, when in normal position, thus presenting the area of the upper end of the sleeve 29 to fluid pressure in a manner to be described. The upper end of the cylinder 28 communicates with the lower end of the conduit 23 through a passage 37.

An adjusting sleeve 38 is slidable in the lower end of the guide 33 and is operative for limiting the downward movement of the sleeve 29. The lower end of the adjusting sleeve 38 projects from the lower end of the casing 27 and is pivotally connected as at 39 to one end of a lever 40. This lever is pivotally connected intermediate its ends as at 41 to a link 42 having its upper end pivotally supported by the casing 27 as at 43. The lever 40 may be controlled in any desired manner to hold the adjusting sleeve 38 in any adjusted position. It will be noted that the link 42 permits the linear movement of the pivot 39 incident to axial adjustment of the adjusting sleeve 38.

In Figure 1 manual means is illustrated as being operative for adjusting the position of the sleeve 38. A nut 44 has a pivot pin 45 extending from opposite sides thereof for engagement in the slots 46 of the arms of the lever 40. A stem 47 is threaded in the nut 44 and extends upwardly through an arm 48 carried by the casing 27. Nuts 49 on opposite sides of the arm 48, prevent axial movement of the stem 47, and this stem is provided at its upper end with an operating knob 50. Obviously rotation of this knob moves the lever 41 to arrange the adjusting sleeve 38 in any desired position.

A pump plunger 51 is reciprocable in the sleeves 29 and 38. This plunger is provided in its upper end with an axial passage 52 communicating at its lower end with a lateral passage 53 adapted at the end of the pumping stroke to communicate with a port 54 formed in the sleeve 29. This port, in turn, is in constant communication with a small passage 55 leading to a small cylinder 56. A cylinder 57 of reduced diameter extends above the cylinder 56 and receives a slidable stem 58 having a small piston 59 at its lower end operating in the cylinder 56.

The upper end of the stem 58 terminates in a valve 60 normally engaging a valve seat 61, and a compression spring 62 normally urges the valve 60 against its seat. It will be noted that the upper end of the small piston 59 is arranged slightly below the upper end of the cylinder 56 when the valve 60 is in engagement with its seat, and accordingly the area of the upper end of the piston 59 around the stem 58 is free to be subjected to the pressure of fluid discharged through the passage 55 in a manner to be described.

The valve 60 controls a port 63 communicating with a passage 64 leading to the reservoir 36. This reservoir is supplied with fuel oil through a pipe 65, and the mechanism including the pump plunger 51 operates to pump fuel oil through the passage 23 and to return fuel therefrom to the reservoir 36 upon the seating of the valve 15. For the latter purpose, a by-pass conduit 66 has one end communicating with the passage 23 and its other end communicating with the cylindrical opening 57 to return fuel oil to the reservoir when the valve 60 is opened in a manner to be described.

The lower end of the pump plunger projects a substantial distance below the casing 27 and is provided at its lower end with a roller 67 engaging a cam 68 carried by a shaft 69. A relatively light spring 67' is employed for urging the plunger 51 downwardly. The shape of the cam is preferably such as to impart relatively rapid movement to the plunger 51 at the beginning of the fuel injection in order to obtain a quick opening of the injection valve, as will become apparent. During the latter part of the pumping stroke of the plunger, the rate of movement of the plunger need be only sufficiently rapid as to pump oil at the rate at which the oil is injected into the engine. For this purpose, the cam 68 is shaped substantially as shown in Figure 1 and is rotatable in the direction of the arrow.

Adjacent the valve seat 12, the projection 13 is provided with an annular passage 70 to which the injecting fluid is supplied through a pipe 71. The injecting fluid, as it passes from the passage 70 through the injector nozzle, is in the form of a heated gas which may be heated air, or it may be heated hydrogen or some other combustible gas. More specifically, the injecting fluid is preferably a readily vaporizable normally liquid fuel such as a light hydrocarbon, or a derivative of a hydrocarbon such as alcohol, and as will be further explained, such fuel may be supplied to the annular passage 70 in gaseous form, or at such temperature and pressure that it will be immediately converted into gaseous form promptly upon the opening of the injection valve. Still more specifically, the injecting fluid is preferably alcohol, and such fluid is preferably supplied to the passage 70 in the neighborhood of or slightly above its critical temperature and critical pressure.

Means are employed for subjecting the injecting fluid to the action of heat and pressure to supply the fluid to the passage 70 in the desired physical condition. A pipe 72 is connected to a suitable source of injecting fluid such as alcohol, and a suction valve 73 controls communication between the pipe 72 and a pump chamber 74. A pump cylinder 75 communicates with the chamber 74 and is provided with a reciprocating pump plunger 76 which may be actuated from any suitable source. It also will be apparent that the pump is illustrated only diagrammatically and that any suitable type of pump may be employed.

Upon upward movement of the plunger 76 as illustrated in Figure 1, the injecting fluid will be drawn into the chamber 74 from which it will be expelled upon downward movement of the plunger into an outlet pipe 77, past a discharge valve 78. The pump obviously may be of such capacity as to satisfy the maximum demands of the motor, and accordingly excess injecting fluid is pumped under most conditions. To take care of the excess fluid, a by-pass return pipe 79 is connected between the pipes 77 and 72, and a relief valve 80 controls communication through the pipe 79 to determine the pump outlet pressure at which the fluid will be by-passed to the supply pipe 72. The relief valve may be of any conventional type, and is adjustable as to its opening pressure by means of a handle 81.

The pipe 77 leads to one end of a coil 82 arranged in a jacket 83 connected in the exhaust pipe 84 of the engine. The other end of the coil 82 is connected by a pipe 85 with the interior of a heating casing 86 in which is arranged an electrical heating unit 87. The electrical heating device is preferably employed for the purpose of heating the injecting fluid upon the starting of the motor, and a suitable portion of the apparatus, such as the pipe 85, may be provided with a conventional thermostat 88 for cutting out the heating coil 87 after the engine has been running a sufficient length of time to properly heat the injecting fluid passing through the coil 82. Accordingly it will be apparent that the heating coil 82 and associated elements constitute the normal heating means for the injecting fluid, and that the fuel may be supplied under pressure to the injector nozzle by means of the pump described, the relief valve 80 and its adjustment determining the pressure of the injecting fluid supplied to the nozzle in accordance with the fluid being employed.

As previously stated, any suitable means may be employed for adjusting the vertical position of the sleeve 38, and in Figure 1 manually operable means has been illustrated for this purpose. If desired, the sleeve 38 may partake of vertical adjustment according to the speed of operation of the engine. In Figure 3 a shaft 89, suitably driven by the engine, carries a conventional governor 90 having a lower vertically slidable collar 91 connected by a link 92 to the free end of the lever 40. As will become apparent, increases in engine speed thus may be utilized to reduce the total injection of fuel into the engine at each operation of the injecting means.

The operation of the apparatus is as follows:

As previously stated, the collar 38 may be arranged in desired adjusted positions, the purpose of which will become apparent. Assuming that the collar 38 is fixed in a predetermined position with the engine operation being initiated, the rotation of the shaft 69 causes the cam 68 to reciprocate the pump plunger 51 to effect the fuel injection operation, while the injecting fluid will be heated by the electric heating element 87.

Assuming the parts to be in the positions shown in Figure 1 it will be apparent that fuel will be present in the interior of the upper end of the sleeve 29, and also in the conduit 23 and passage 66, fuel being admitted through the ports 34 and 35. Rotation of the shaft 69 in a counter-clockwise direction causes the cam 68 to lift the plunger 51, and initial movement of this plunger causes its upper end to move across the port 34 and thus close communication between the interior of the upper end of the sleeve 29 and the reservoir 36 in which the relatively heavy fuel oil is maintained, fuel being constantly supplied to the reservoir through the pipe 65.

After the port 34 is closed, continued upward movement of the plunger 51 subjects the fuel above the plunger to pressure which reacts against the area of the upper end of the sleeve 29 to cause this sleeve to move downwardly against the tension of the spring 32. The tension of this spring need be sufficient only to return the sleeve 29 to its upper position upon the completion of the pumping operation. The pressure exerted on the upper end of the sleeve 29 causes the latter to move downwardly until the lower end of the sleeve contacts with the upper end of the adjusting sleeve 38, whereupon further downward movement of the sleeve 29 is arrested. Continued upward movement of the plunger 51 immediately increases the pressure in the body of the fuel above the plunger, and this pressure acts against the inner face of the piston 18, thus causing the piston and the elements carried thereby to be moved to the right as viewed in Figure 1 against the tension of the spring 20. This action unseats the needle valve 15 and fuel under pressure is pumped from the conduit 23 through the passage 24 and thus into the injection nozzle.

During this operation it will be apparent that the pump plunger 76 will be operating and from the plunger to the injection nozzle the injection fluid will be maintained under substantial pressure. Therefore, when the needle valve 15 is retracted under the influence of the pressure of the relatively heavy fuel oil, the injection fluid will be discharged from the annular passage 70 through the nozzle 11, thus injecting the proper charge of fuel into the engine.

The working stroke of the plunger 51 will be determined by the position of the adjusting sleeve 38, which limits the downward movement of the sleeve 29. Prior to the point at which the plunger 51 reaches the upper limit of its stroke, which point will be determined by the position of the sleeve 38, as will become apparent, the port 53 of the plunger will come into registration with the port 54 whereupon fluid under the pressure generated by the pumping action will flow through the axial passage 52 of the plunger, and thence through port 53 and passage 55 into the small cylinder 56. The pressure in the liquid in the cylinder 56 acts against the upper exposed surface of the piston 59, whereupon this piston will be moved downwardly against the tension of the spring 62 to unseat the valve 60. The accumulated pressure in the conduit 23 and passage 66, and the fuel oil-containing spaces in communication therewith, will be relieved and oil will flow from the passage 66 through port 63 and thence back into the reservoir 36 (Figure 2) through the passage 64. The pressure acting against the inner end of the piston 18 thus will be released, and the spring 20 will seat the needle valve 15.

Upon subsequent downward movement of the plunger 51, the initial movement will close communication between the ports 53 and 54, followed by the upward movement of the sleeve 29 to the normal position shown in Figure 1. As the plunger 51 approaches its lower limit of movement, additional fuel oil will be admitted into the upper end of the plunger 29 through the port 34, and when the plunger reaches its lower limit of movement, pressure above the piston head 59 is released through the port 54 to permit the valve 60 to close, the upper end of the port 54 extending slightly above the upper limit of the plunger 51 when the latter is in its lowermost position. The foregoing operation is then repeated during the next rotation of the cam shaft 69, as will be apparent. The cycle of operation obviously is repeated throughout the operation of the engine.

The hot exhaust gases passing through the pipe 84 and jacket 83 heat the injection fluid in the coil 82, such fluid being discharged into the casing 86 through the pipe 85. When the fluid flowing through the pipe 85 reaches the desired temperature, the thermostat 88 will break the circuit through the heating unit 87, whereupon the injection fluid will be maintained at its proper temperature by the exhaust gas heater.

Assuming that it is desired to increase each fuel charge, the knob 50 may be turned to lower the free end of the lever 40, thus elevating the adjusting sleeve 38. It will be apparent under such conditions that a shorter portion of the pumping stroke of the piston 51 will be taken up in moving the sleeve 29 downwardly, and a greater portion of the pumping stroke will be utilized for injecting the successive charges into the engine by maintaining the needle valve 15 open for longer periods. In this connection, it will be noted that the shorter the downward stroke of the sleeve 29 in accordance with the position of the adjusting sleeve 38, the longer will be the pumping stroke of the plunger 51 before the port 53 uncovers the port 54 to release the pressure in the pumped fuel oil.

Conversely, the fuel charges may be reduced by adjusting the sleeve 38 to a lower position. In such case a greater portion of the pumping stroke of the plunger will be utilized in forcing the sleeve 29 downwardly and a lesser portion will be utilized in retaining the needle valve 15 in open position. Likewise, the longer the movement of the sleeve 29, the sooner the port 53 will uncover the port 54 to relieve the pressure in the pumped fuel oil. Thus the individual fuel charges may be reduced as desired.

The relationship between the areas of the upper end of the sleeve 29 and the upper end of the plunger 51 fixes the relationship between the beginning and the end of the injection. Assuming, under normal speed, that injection starts 10 degrees, crank travel, before dead center and ends 30 degrees after dead center, the engine speed may be reduced by lowering the sleeve 38. If the area of the upper end of the sleeve 29 equals the area of the upper end of the plunger 51, both the sleeve and plunger will have moved the same distance when the sleeve 29 comes to rest upon the upper end of the sleeve 38, and the beginning of injection will be retarded to the same extent that the end of the period of injection has been advanced. Assumed, in order for the engine to idle, that the period of injection must be reduced to 10 degrees crank travel. In the present construction, adjustment may be made so that injection will start 5 degrees after dead center and end 15 degrees after dead center. In such case, the area of the end of the sleeve 29 should be less than the area of the end of the plunger 51, whereby the sleeve 29 will move at a higher speed than the plunger 51, and injection will not be retarded as much as the end of the injection period will be advanced. The relative areas of the upper ends of the sleeve 29 and plunger 51 readily can be designed so that injection will not start later than dead center under all operating positions of the sleeve 38, which is a vital requirement, and a suitable injector can be made for any kind of engine or engine speed.

For example, a small high speed engine will require a retardation of the opening of the injector valve nearly equal to the advancing of the time of valve closure. On the other hand a large slow speed engine can stand only a small retardation of the time of the opening of the injection valve, and the injection period must be shortened principally by advancing the time of valve closure.

The form of the invention shown in Figure 3 is the same in principle as the form shown in Figure 1 except that it employs an engine driven governor for determining the position of the sleeve 38. This construction may be desired in installations where an engine is to be driven at a relatively constant speed.

In order to adapt the rate of injection to varying conditions, the throttle valve 25 may be employed in the passage 24, although its use ordinarily is unnecessary. The valve 25 may be omitted where the rate of fuel consumption is fairly uniform, in which case the cross-sectional area of the passage 24 will be predetermined in accordance with the particular nozzle. The check valve 26 may be employed in the passage 24 if the relatively heavy fuel oil contains sufficient low boiling fractions to form a considerable amount of vapor upon the release of pressure after the port 53 comes into registration with the port 54.

As previously stated, engines of the fuel injection type, such as Diesel engines, commonly employ either of two methods of injection, namely, air pressure and mechanical, and the former is advantageous over the latter in that it provides more perfect atomization of the fuel. Air injection as it has been consistently practiced, has been found to be disadvantageous because of the chilling effect incident to adiabatic heat losses occurring upon the expansion of the air.

In accordance with the present method I have found that if relatively highly heated gases are supplied to the annular passage 70 at pressures above the internal pressure of the engine at the point at which the needle valve 15 is opened, highly advantageous results can be obtained. For example, relatively highly heated air may be supplied to the passage 70 at a pressure above the internal pressure of the engine and upon the opening of the needle valve 15, the injecting fluid will inject a fuel charge without heat losses sufficient to chill the fuel and thus result in the substantial loss in power incident to the conventional operation of a Diesel type engine.

Further increased efficiency can be accomplished by employing a combustible gas such as hydrogen by introducing it in the manner previously described, i. e. by supplying the gas in a heated condition and at a maintained pressure above that of the internal pressure of the engine. In such case, the relatively highly heated hydrogen also prevents the chilling or condensation of the relatively heavy fuel oil supplied through the passage 24, and provides perfect atomization with the accompanying reduction in the delay period for igniting the fuel after injection. Thus increased efficiency is provided in the engine by assuring a more uniform burning of the fuel and therefore a more uniform production of power.

As the injection medium, I may use water, but I prefer to employ one of the lighter hydrocarbons such as gasoline or benzine or a derivative of hydrocarbon such as an alcohol. Where the expression "hydrocarbon compound" is employed in the claims, therefore, this expression is intended to cover volatile compounds of both the hydrocarbon and alcohol groups. When such a compound is employed as the injection medium, the pressure and temperature of the medium are so related to each other that the pressure will be at the vaporization point for the predetermined temperature, and above that of the internal pressure in the engine. However, the pressure may be slightly below or above that of the vaporization point at the predetermined temperature, so long as it is maintained above the necessary injection pressure.

Where the expression "normal liquid" is employed in the claims, this expression is intended to mean a fluid which is liquid at ordinary or room temperatures such as the hydrocarbons and derivatives thereof referred to above.

More specifically, I prefer to employ alcohol, such as ethyl alcohol, as the injection medium because of its high efficiency in the present system, and because of its suitable and easily maintained relatively low critical temperature and pressure. When alcohol is employed, it is preferred that it be maintained approximately at its critical temperature and pressure, and it will be apparent that upon each opening of the needle valve 15, the alcohol in gaseous form will be discharged through the injector nozzle together with the proper charge of the heavier fuel from the passage 24.

It will be apparent that the apparatus described is partitcularly advantageous for use in the practice of the method, and that the apparatus is relatively simple and easily adjusted and controlled. Relatively heavy fuel oil may be advantageously employed and will provide a high degree of operating efficiency. The floating sleeve 29 and its control means provide, in conjunction with the pump plunger 51, a highly effective means for determining each fuel charge, and each fuel charge may be quickly and readily adjusted by the means for vertically moving the sleeve 38.

It is to be understood that the methods herein described are to be taken as preferred examples of the same and that various changes in the practice of the method may be made without departing from the spirit of the invention or the scope of the subjoined claims.

I claim:
1. The method of injecting fuel charges into an internal combustion engine cylinder through an injection nozzle, which comprises supplying a relatively heavy hydrocarbon fuel oil to the nozzle, and subjecting it to the injection action of a normal liquid approximately at its critical temperature and critical pressure.

2. The method of injecting fuel charges into an internal combustion engine cylinder through an injection nozzle, which comprises supplying a relatively heavy hydrocarbon fuel oil to the nozzle, and subjecting it to the injection action of a normal liquid above its critical temperature and critical pressure.

3. The method of injecting fuel charges into an internal combustion engine cylinder through an injection nozzle, which comprises supplying a relatively heavy hydrocarbon fuel oil to the nozzle, and subjecting it to the injection action of a lighter hydrocarbon compound in liquid form at a pressure in excess of the pressure within the engine cylinder at the time of injection and at a temperature approximately at the point of vaporization at such pressure.

4. The method of injecting fuel charges into an internal combustion engine cylinder through an injection nozzle, which comprises supplying a relatively heavy hydrocarbon fuel oil to the nozzle, and subjecting it to the injection action of a lighter hydrocarbon compound in liquid form at a pressure in excess of the pressure within the engine cylinder at the time of injection and at a temperature above the point of vaporization at such pressure.

5. The method of injecting fuel charges into an internal combustion engine cylinder through an injection nozzle, which comprises supplying a relatively heavy hydrocarbon fuel oil to the nozzle, and subjecting it to the injection action of a lighter hydrocarbon compound approximately at its critical temperature and critical pressure.

6. The method of injecting fuel charges into an internal combustion engine cylinder through an injection nozzle, which comprises supplying a relatively heavy hydrocarbon fuel oil to the nozzle, and subjecting it to the injection action of a lighter hydrocarbon compound under temperature and pressure conditions approximating critical conditions, at least one of such conditions being above the critical point.

JOSEPH G. KIMMEL.